United States Patent [19]

McTaggart

[11] Patent Number: 5,617,944
[45] Date of Patent: Apr. 8, 1997

[54] SHUTTLE TRANSFER ASSEMBLY

[75] Inventor: Michael D. McTaggart, Windsor, Canada

[73] Assignee: Valiant Machine & Tool, Inc., Windsor, Canada

[21] Appl. No.: 490,755

[22] Filed: Jun. 15, 1995

[51] Int. Cl.$^6$ ..................................................... B65G 17/12
[52] U.S. Cl. .................................. 198/468.6; 198/468.1; 414/744.3; 414/749; 901/7
[58] Field of Search ............................. 414/744.1, 744.2, 414/744.3, 749; 901/7; 198/346.1, 468.1, 468.6, 369.5

[56]  References Cited

U.S. PATENT DOCUMENTS

| 4,460,081 | 7/1984 | Stark et al. | 198/346.1 X |
| 4,480,738 | 11/1984 | Mattson | 198/346.1 |
| 4,718,810 | 1/1988 | Hoehn et al. | 198/346.1 X |

Primary Examiner—Donald W. Underwood
Attorney, Agent, or Firm—Gifford, Krass, Groh, Sprinkle, Patmore, Anderson & Citkowski, P.C.

[57] ABSTRACT

A shuttle transfer assembly is provided for transferring parts between at least two conveyor lines. The shuttle assembly includes a base and a transfer table which is mounted to the base via a carriage assembly. A conveyor section is in turn mounted to the transfer table. The transfer table under program control is both rotated about a vertical axis and linearly displaced by the carriage assembly so that the conveyor section on the transfer table is aligned with a first selected conveyor line. A loader assembly on the transfer table selectively moves a number of parts from the first conveyor line onto the conveyor section. The transfer table is then moved so that its conveyor section is aligned with a second conveyor line. A unloader assembly then pushes the parts on the conveyor section from the transfer table and onto the second conveyor line.

9 Claims, 3 Drawing Sheets

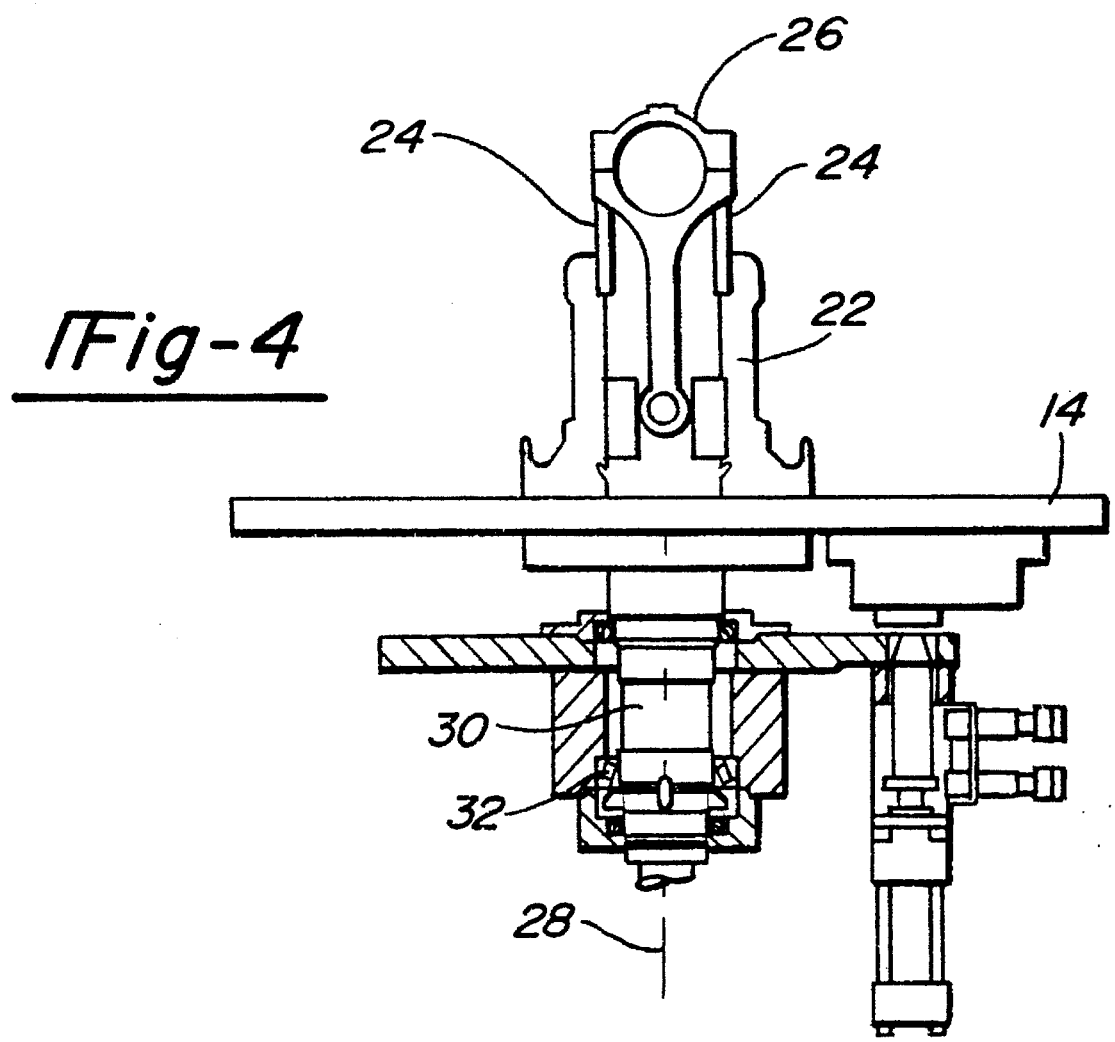

SHUTTLE TRANSFER ASSEMBLY

BACKGROUND OF THE INVENTION

I. Field of the Invention

The present invention relates generally to conveying systems and, more particularly, to a shuttle assembly for transferring parts between two or more conveyor lines.

II. Description of the Prior Art

There are many manufacturing situations where it is desirable to transfer parts between different conveyor lines. For example, in some situations, two incoming conveyor lines run in parallel to each other. These conveyor lines terminate at a shuttle transfer which moves the parts between one of the incoming conveyor lines and a third or more outgoing conveyor lines.

These previously known shuttle assemblies are typically programmable so that they may selectively transfer the parts between the various conveyor lines. Thus, for example, in the event that one incoming conveyor line is shut down for any reason, such as maintenance, the shuttle assembly is programmed so that a transfer of parts from the other incoming conveyor line and to the outgoing conveyor line(s).

These previously known shuttle assemblies have typically been custom designed for their own particular conveyor system. Consequently, the means for transferring the parts from the incoming conveyor lines and onto the shuttle assembly, as well as the means for transferring the parts from the shuttle assembly and to the outgoing conveyor lines, must be individually engineered, designed and constructed for each conveyor system. This necessarily increases the manufacturing costs and engineering costs for the conveyor system and shuttle assembly.

SUMMARY OF THE PRESENT INVENTION

The present invention provides a shuttle assembly which overcomes all of the above-mentioned disadvantages of the previously known devices.

In brief, the shuttle assembly of the present invention comprises a base having a transfer table mounted to it via a carriage assembly. A conveyor section is also mounted to the transfer table.

Means are provided for moving the transfer table so that the conveyor section on the transfer table is aligned with a first incoming conveyor line. Loader means on the transfer table are then selectively operable for loading parts from the first incoming conveyor line onto the conveyor section of the transfer table.

Means are then provided for moving the carriage assembly and/or the transfer table such that the conveyor line on the transfer table is aligned with a second outgoing conveyor line. An unloader assembly on the transfer table is then actuated to unload the parts from the conveyor section on the transfer table and onto the second outgoing conveyor line.

Preferably, the transfer table is rotatably mounted to the carriage assembly about a vertical axis while the carriage assembly is longitudinally displaced by a linear actuator. Consequently, the conveyor section on the transfer table can be selectively aligned with conveyor lines extending in different directions from the shuttle assembly.

Since the shuttle assembly is modular in construction, i.e. both the loader and unloader assemblies as well as the table moving means are contained within the shuttle assembly, the shuttle assembly can be employed with only little engineering modification, if any, in a wide variety of conveyor systems.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 4 is a view taken substantially along line 4—4 in FIG. 2 and enlarged for clarity.

DETAILED DESCRIPTION OF A PREFERRED EMBODIMENT OF THE PRESENT INVENTION

Figure 1A:
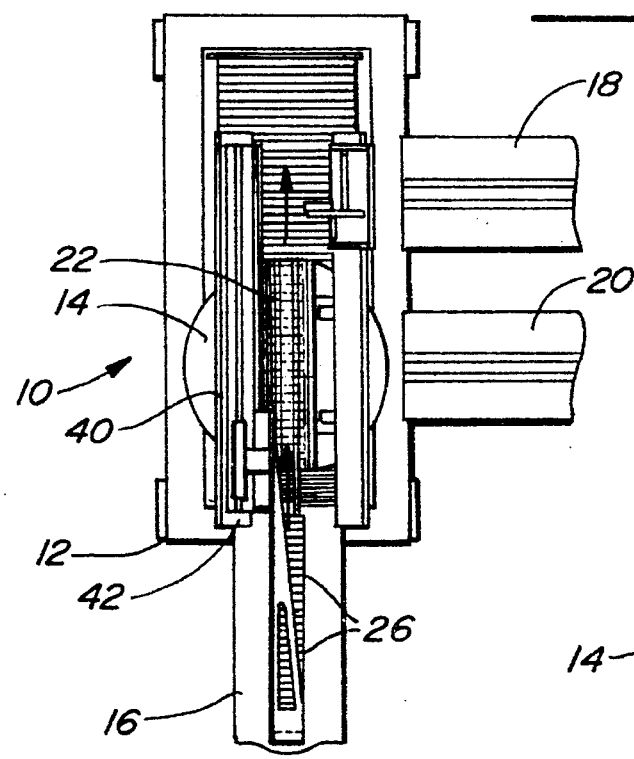
FIGS. 1A–1C are top diagrammatic views illustrating the operation of a preferred embodiment of the shuttle assembly of the present invention.
Figure 1B:
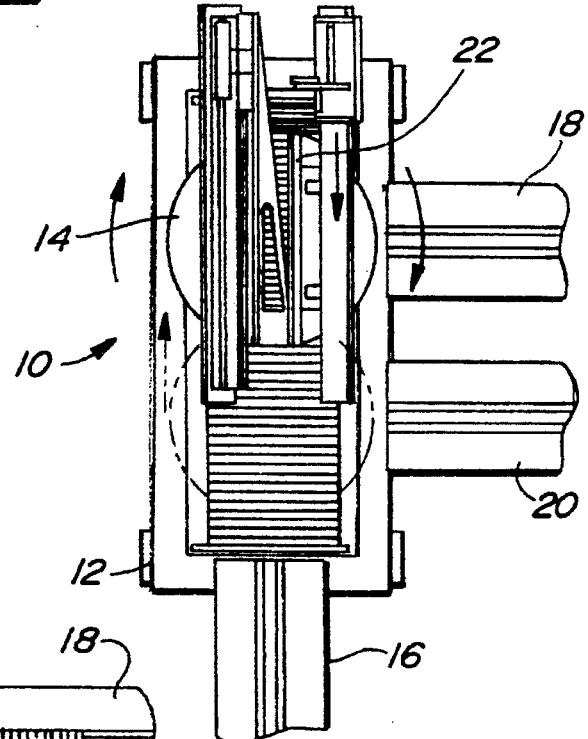
Figure 1C:
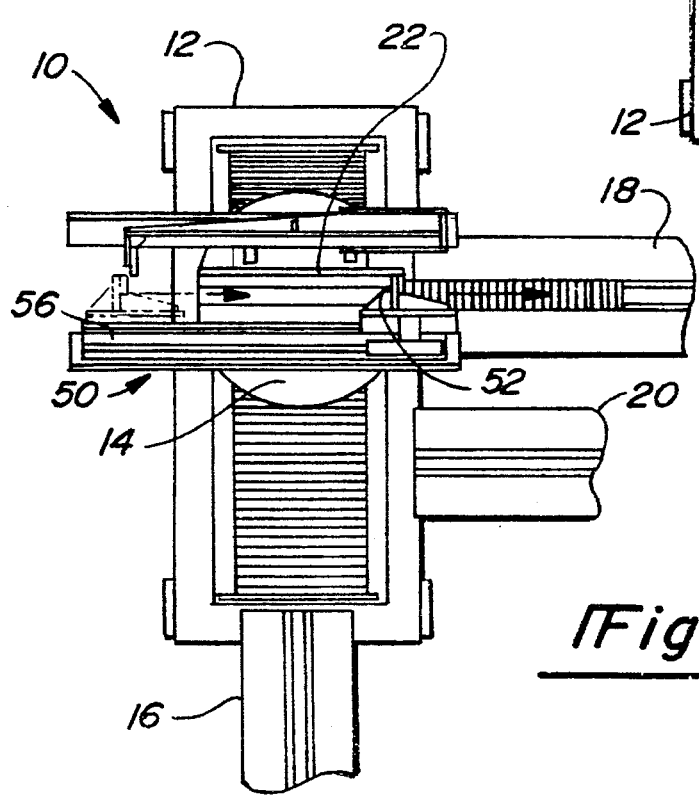

With reference first to FIGS. 1A–1C and FIG. 2, a preferred embodiment of the shuttle assembly 10 of the present invention is thereshown and comprises a base 12 having a carriage assembly 36 slidably mounted to the base 12. A transfer table 14 is, in turn, mounted to the carriage assembly 38. As shown in FIGS. 1A–1C, the shuttle assembly 10 is designed for transferring parts between one or more incoming conveyor line(s) 16 (only one shown) and one or more outgoing conveyor lines 18 and 20.

As best shown in FIG. 4, a conveyor section 22 is mounted to the top of the transfer table 14. This conveyor section 22 mirrors the incoming conveyor line 16 and outgoing conveyor lines 18 and 20. As illustrated in FIG. 4, the conveyor section includes two spaced apart stationary rails 24 which are designed to receive and support a series of parts 26, such as a piston connecting rods, between the incoming and outgoing conveyor lines.

Still referring to FIG. 4, the transfer table 14 is rotatably mounted relative to the carriage assembly 36 about a vertical axis 28. The vertical axis 28 intersects the center of the conveyor line 22. Furthermore, any conventional shaft 30 and bearing assembly 32 can be used to rotatably mount the transfer table 14 to the carriage assembly 36. A rotary actuator 34 (FIG. 3) is operatively connected with the shaft 30 for rotatably driving the transfer table between, for example, the rotary positions shown in FIGS. 1A and 1C.

Figure 2:
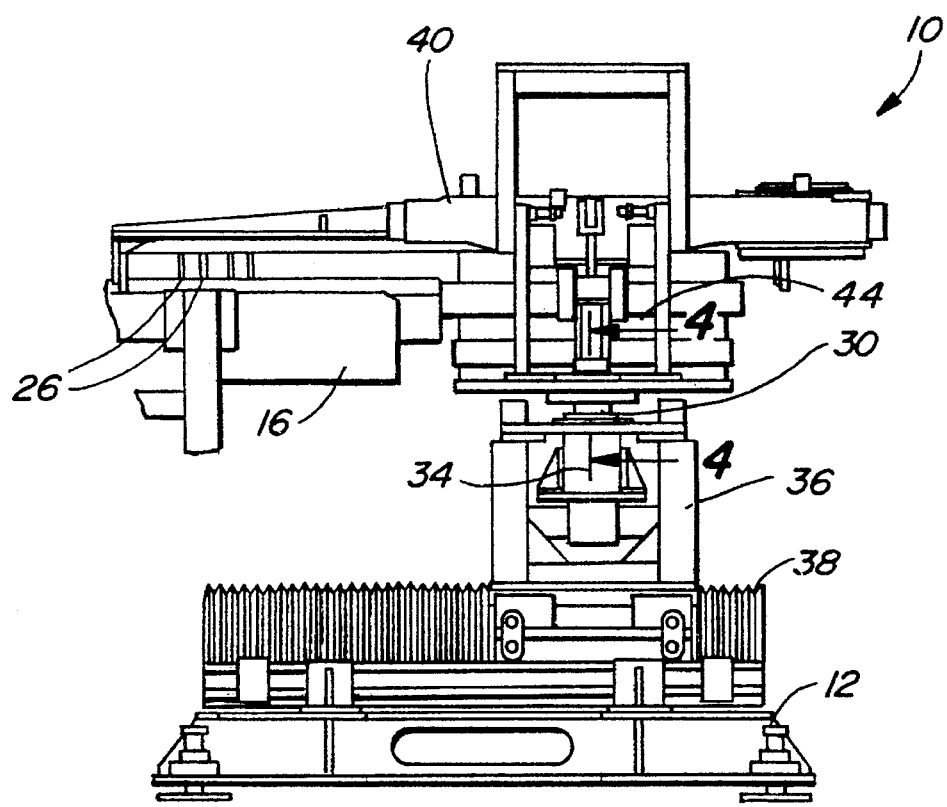
FIG. 2 is a side view illustrating a preferred embodiment of the present invention.

With reference now to particularly to FIG. 2, the transfer table shaft 30 as well as the rotary actuator 34 are mounted to the carriage 36. The carriage 36, in turn is mounted to the base 12 via a linear actuator 38.

The linear actuator 38 can comprise, for example, a hydraulic or pneumatic actuator, ball and screw assembly, or their equivalents. Activation of the linear actuator 38 thus linearly moves the transfer table 14 in a horizontal plane as, for example, illustrated in FIGS. 1A and 1B. Furthermore, although pneumatic and hydraulic actuators typically move the carriage between two extreme end positions, a ball and screw assembly, or its equivalent, may be used to selectively move the carriage assembly with its transfer table between any number of preselected limits within the confines of the limits of travel of the linear actuator 38.

With reference now to FIGS. 1A–1C, activation of both the rotary actuator 34, as well as the linear actuator 38, selectively moves the transfer table 14 so that its conveyor section 22 is selectively aligned with two or more of the conveyor lines 16, 18 and 20. For example, in FIG. 1A, the transfer table 14 is positioned so that its conveyor section 22 is aligned and adjacent to the incoming conveyor line 16. Activation of the linear actuator 38 moves the transfer table 14 to the position shown in FIG. 1B. Thereafter, rotation of the transfer table 14 by the rotary actuator 34 rotates the transfer 14 to the position shown in FIG. 1C in which the conveyor section 22 is aligned with the outgoing conveyor line 18. Activation of the linear actuator 38 to the position shown in FIG. 1A would, conversely, move the conveyor line 22 so that it would be aligned with the outgoing conveyor line 20. Furthermore, since the transfer table 14 is rotatably mounted to its carriage 36, the various conveyor lines 16–20 can extend outwardly from the shuttle assembly 10 at any desired direction.

Figure 3:
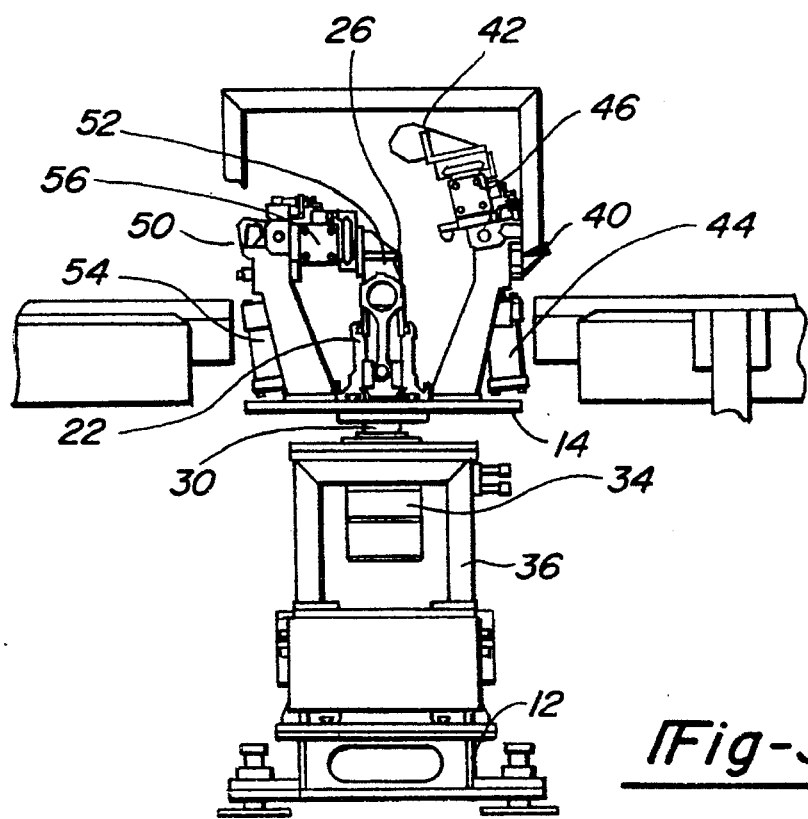
FIG. 3 is an end view illustrating a preferred embodiment of the present invention.

With reference now to FIGS. 1A, 2 and 3, a loader assembly 40 is provided for selectively loading parts 26 from the incoming conveyor line 16 and onto the conveyor section 22 on the transfer table 14. The loader assembly 40 includes a loader arm 42 which is movable between an upper position, illustrated in FIG. 3 and a lower position, illustrated in FIG. 2. In its upper position, the unloader arm 42 is positioned above the parts 26 whereas in its lower position, the loader arm 42 registers with the upper portion of the parts 26. A pneumatic or hydraulic actuator 44 (FIGS. 2 and 3) is used to move the loader arm 42 between its upper and lower position.

The loader assembly 40 further includes a linear actuator 46 which moves the loader arm 42 between an extended position, illustrated in FIG. 2, and a retracted position, illustrated in solid line in FIG. 1A. In its extended and lower position (FIG. 2) the loader arm 42 is positioned behind a number of parts 26 on the incoming conveyor line 16. Movement of the loader arm 42 to its retracted position moves the arm 42 so that it is positioned above the shuttle assembly 10. In doing so, the loader arm 42 pushes the parts 26 from the incoming conveyor line 16 onto the shuttle assembly conveyor section 22.

Referring now to FIGS. 3 and 1C, an unloader assembly 50 is also mounted to the transfer table 14. The unloader assembly 50 includes an unloader arm 52 which is also movable between the lower position, illustrated in FIG. 3, and an upper position (not shown) by an actuator 54. In its lower position (FIG. 4) the unloader arm 52 registers with an upper portion of the parts 26 on the conveyor section 22.

Still referring to FIGS. 3 and 1C, a linear actuator 56 is operatively coupled with the unloader arm 52 to move the arm 52 between its retracted position, illustrated in phantom line in FIG. 1C, and an extended position, illustrated in solid line in FIG. 1C. Thus, when the transfer table 14 is positioned so that its conveyor section 22 is aligned with the outgoing conveyor line 18, actuation of the unloader arm 52 from its retracted position and to its extended position, pushes parts from the conveyor section 22 onto the outgoing conveyor line 18.

With reference now to FIGS. 1A–1C, in operation the loader arm 42 is first moved to its upper position (FIG. 3) and then to its extended position illustrated in phantom line in FIG. 1A. The loader arm 42 is then moved to its lower position so that the arm 42 is positioned behind and aligned with parts 26 on the incoming conveyor line 16. Actuation of the linear actuator 46 then moves the loader arm 42 to its retracted position, illustrated in solid line in FIG. 1A, thus pushing the parts 26 from the incoming conveyor line 16 and onto the conveyor section 22.

The carriage 36 is then linearly displaced to the position shown in FIG. 1B by actuation of the linear actuator 38. The rotary actuator 34 is then actuated thus rotating the transfer table 14 to the position illustrated in FIG. 1C such that the conveyor section 22 on the transfer table 14 is aligned with the outgoing conveyor line 18.

Thereafter, with the unloader arm 52 in its lower position, actuation of the actuator 56 from its retracted position and to its extended position pushes the parts 26 from the conveyor section 22 onto the outgoing conveyor line 18. The unloader arm 52 is then moved to its retracted position and the above-identified process is repeated.

Alternatively, of course, the transfer table 14 can be position so that its conveyor line 22 is aligned with the outgoing conveyor line 20. In doing so, parts are transferred from the incoming conveyor line 16 to the outgoing conveyor line 20. The operation of the various actuators, furthermore, is subject to program control so that the sequence of transfer of the parts from the various conveyor lines can be changed as required.

From the foregoing, it can be seen that the shuttle transfer assembly of the present invention provides a unique and novel shuttle transfer assembly for transferring parts between two or more conveyor lines. Furthermore, since the shuttle assembly of the present invention is self-contained and modular in construction, it may be used with little or no modification to the various incoming and outgoing conveyor lines. Instead, only the program control of the shuttle assembly need be modified in order to control the sequence of operation of the shuttle invention.

Having described my invention, however, many modifications thereto will become apparent to those skilled in the art to which it pertains without deviation from the spirit of the invention as defined by the scope of the appended claims.

I claim:

1. A shuttle transfer assembly for transferring parts between at least two conveyor lines comprising:

a base, a transfer table mounted to said base, a conveyor section mounted to said transfer table, means for moving said transfer table so that said conveyor section is aligned with a selected conveyor line, means on said transfer table operable when said conveyor section is aligned with a first conveyor line for loading parts from said first conveyor line onto said conveyor section, and means on said transfer table operable when said conveyor section is aligned with a second conveyor line for unloading parts from said conveyor section onto said second conveyor line wherein said loading means comprises a loader arm, means for moving said loader arm between an upper position in which said loader arm is positioned above parts on one of said conveyor lines and a lower position in which said loader arm is aligned with parts on said one of said conveyor lines, means for linearly moving said loader arm between an extended and a retracted position, wherein in said extended position said loader arm is positioned over a portion of said one of said conveyor lines and wherein in said retracted position said loader arm is positioned over said table.

2. The invention as defined in claim 1 wherein said means moving said transfer table comprises means for rotating said table about a substantially vertical axis.

3. The invention as defined in claim 1 wherein said means for moving said transfer table comprises means for linearly and horizontally moving said table.

4. The invention as defined in claim 3 wherein said means for moving said transfer table comprises a piston and cylinder actuator for linearly moving said transfer table relative to said base.

5. The invention as defined in claim 3 wherein said means for moving said transfer table comprises a ball and screw actuator for linearly moving said transfer table relative to said base.

6. The invention as defined in claim 1 wherein said means for linearly moving said loader arm comprises a pneumatic piston and cylinder actuator.

7. The invention as defined in claim 1 wherein said unloading means comprises an unloader arm, said unloader arm being aligned with parts on said conveyor section, means for linearly moving said unloader arm between an extended and a retracted position, wherein in said extended position said unloader arm is positioned adjacent one end of said conveyor section and wherein in said retracted position said unloader arm is positioned adjacent an opposite end of said conveyor section.

8. The invention as defined in claim 7 wherein said means for linearly moving said unloader arm comprises a pneumatic piston and cylinder actuator.

9. The invention as defined in claim 8 and comprising means for moving said unloader arm between an upper position and a lower position wherein in said upper position said unloader arm is positioned above parts on said conveyor section and wherein in said lower position said unloader arm is in alignment with parts on said conveyor section.

\* \* \* \* \*